United States Patent
van de Weg et al.

(10) Patent No.: US 7,304,113 B2
(45) Date of Patent: Dec. 4, 2007

(54) METHOD FOR PARTIALLY AND SELECTIVELY HYDROGENATING POLYMERS MADE OF CONJUGATED DIENES

(75) Inventors: Henk van de Weg, Amsterdam (NL); Mark Hageman, Amsterdam (NL)

(73) Assignee: Kraton Polymers U.S. LLC, Houston, TX (US)

( * ) Notice: Subject to any disclaimer, the term of this patent is extended or adjusted under 35 U.S.C. 154(b) by 0 days.

(21) Appl. No.: 10/565,583

(22) PCT Filed: Jul. 9, 2004

(86) PCT No.: PCT/EP2004/051439

§ 371 (c)(1),
(2), (4) Date: Jan. 23, 2006

(87) PCT Pub. No.: WO2005/012366

PCT Pub. Date: Feb. 10, 2005

(65) Prior Publication Data

US 2006/0173136 A1    Aug. 3, 2006

(30) Foreign Application Priority Data

Jul. 28, 2003    (EP)    ................... 03102321

(51) Int. Cl.
*C08C 19/02*    (2006.01)
(52) U.S. Cl. ............... 525/332.9; 525/331.9; 525/338; 525/370

(58) Field of Classification Search ............. 525/331.9, 525/332.9, 338, 370
See application file for complete search history.

(56) References Cited

U.S. PATENT DOCUMENTS

| | | | |
|---|---|---|---|
| 2,893,982 A | | 7/1959 | Campbell |
| 3,673,281 A | | 6/1972 | Bronstert et al. |
| 3,700,748 A | * | 10/1972 | Winkler ..................... 525/314 |
| 3,780,138 A | | 12/1973 | Hassell et al. |
| 4,396,761 A | * | 8/1983 | Willis et al. ................. 528/487 |
| 4,595,749 A | | 6/1986 | Hoxmeier |
| 4,992,529 A | | 2/1991 | Hoxmeier |
| 5,057,582 A | | 10/1991 | Hoxmeier et al. |
| 5,705,571 A | | 1/1998 | Tsiang et al. |

FOREIGN PATENT DOCUMENTS

| | | |
|---|---|---|
| WO | 02/16449 A2 | 2/2002 |
| WO | 02/34779 A1 | 5/2002 |
| WO | 02/44281 A1 | 6/2002 |

* cited by examiner

*Primary Examiner*—Roberto Rabago
(74) *Attorney, Agent, or Firm*—Donna B. Holguin; Michael A. Masse; Novak, Druce, Quigg, LLP

(57) ABSTRACT

The invention relates to a method for partially and selectively hydrogenating a polymer made of at least a conjugated diene monomer having a vinyl content of from 20 to 65%, comprising a hydrogenation step on a solution of the polymer, characterized in that the hydrogenation step is performed in the presence of an iron-containing catalyst whereby a hydrogenated polymer is obtained wherein the vinyl content is reduced to 5% or less, whereas the content of 1,4-double bonds is maintained at a level of at least 30%.

21 Claims, 1 Drawing Sheet

METHOD FOR PARTIALLY AND SELECTIVELY HYDROGENATING POLYMERS MADE OF CONJUGATED DIENES

FIELD OF THE INVENTION

The invention relates to a method for partially and selectively hydrogenating a polymer made of at least a conjugated diene monomer comprising a hydrogenation step on a solution of the polymer.

BACKGROUND OF THE INVENTION

Polymers based on conjugated dienes and copolymers based on said conjugated dienes and vinyl aromatic monomers are known elastomers. A selected group thereof is the group composed of thermoplastic elastomers, i.e. block copolymers comprising elastomeric polymer blocks and separate polymer blocks providing physical cross-links. It is also known that the properties of these polymers (in terms of stability and aging and the like) may be improved by hydrogenating the residual olefinic unsaturation. Such residual olefinic unsaturation is the result of polymerizing the conjugated diene in 1,4-manner—leading to a C=C double bond within the polymer chain (hereinafter referred to as 1,4 double bonds)— or in a 1,2-respectively 3,4-manner—leading to a C=C bond attached to the polymer backbone as (substituted) vinyl groups.

The first hydrogenation processes appeared to hydrogenate all residual unsaturation and indeed even all aromatic unsaturation in case of aromatic copolymers. Since this had a substantial impact on the properties of the polymers, so-called selective hydrogenation catalysts were developed. These catalysts only hydrogenate the olefinic unsaturated carbon-carbon bonds. Such hydrogenation processes are nearly always based on nickel-, cobalt-, or titanium-containing catalysts.

Hydrogenating poly(1,4-butadiene) would result in a fully saturated polyolefin without elastomeric properties. It has therefore been recognized that elastomers should have a polymer backbone containing a minimum of about 20% vinyl groups (based on the content of polymerized conjugated dienes).

For certain applications, the use of selective, partially hydrogenated elastomers would be desirable. For instance, in WO 02/44281 bituminous compositions are disclosed with reduced gelation tendency. Ideally, elastomers should have a vinyl content of 20 to 65% before hydrogenation, and of less than 5% after hydrogenation, whereas the content of conjugated dienes polymerized in a 1,4-fashion of 80 to 35% before hydrogenation is not reduced to less than 30% after hydrogenation. Preferably, an elastomer having a vinyl content of 30 to 60% is hydrogenated to an extent wherein the vinyl content is reduced to less than 3%, whereas the 1,4-double bonds content is still maintained at a level of at least 30%. In the context of the present invention, the expressions "selective" and "partial" hence refer to the hydrogenation of only certain of the olefinic unsaturated carbon-carbon bonds.

Inexpensive catalysts for the partial hydrogenation of block copolymers were disclosed, inter alia in U.S. Pat. No. 3,700,748. In this document, the block copolymers were prepared by block polymerizing a monovinyl arene with butadiene, the butadiene block having a vinyl content between about 8 and 80% and thereafter were selectively hydrogenated so as to substantially eliminate the unsaturation in the pendant vinyl groups. Hydrogenation was therein carried out in a solution of an inert hydrocarbon, preferably the same hydrocarbon solvent as employed during polymerization, and in the presence of certain catalysts, e.g. nickel acetyl acetonate reduced with triethyl aluminum. According to this patent the catalyst predominantly hydrogenates all the pendant vinyl groups and not more than about 50% of the unsaturation in the 1,4-structured portions of the block. Although the patent provides an example with partial hydrogenation (iodine number of 81 corresponding to 75% conversion of the initial unsaturated olefinic carbon-carbon bonds) the selectivity has not been shown. When using nickel octanoate in a manner as described in the reference, the selectivity was found to be insufficient. Rather, on repeating the experiment of said document using a polymer having a vinyl content of 45% and using nickel octanoate at 1 ppm level, we found that at 75% conversion of the carbon-carbon olefinic bonds, the 1,4-double bonds content was reduced to less than 30%. When reducing the vinyl content to from 45% to 2%, more than 60% of the 1,4-double bonds were also hydrogenated. For polymers having initial vinyl content greater than 45%, longer times for hydrogenating the vinyl groups are required and as a result also more of the 1,4-double bonds are hydrogenated. It is clear that the hydrogenation catalyst as illustrated in this document does not provide the desired selectivity, at least not for the whole range of polymers having a vinyl content of 8 to 80%.

In a generic manner, apart from nickel, also corresponding cobalt and iron-containing catalysts were mentioned in said reference. However, the reference does not give any indication or suggestion that the corresponding cobalt or iron-containing catalysts would perform better in this respect. Indeed, using these catalysts at the same conditions as mentioned above would only have confirmed the impression that the inventor of U.S. Pat. No. 3,700,748 was too optimistic. It was found that the same polymer hydrogenated in the presence of a cobalt catalyst reduced the 1,4-double bonds content in 1 hour to less than 10%, whereas hydrogenation the same polymer in the presence of 1 ppm of an iron catalyst did not show any significant activity at all.

U.S. Pat. No. 5,705,571 discloses selective hydrogenation of conjugated diene polymers in the presence of a specific hydrogenation catalyst. Selectivity towards vinyl bonds conversion have been noted by the inventors. However, the selectivity achieved in the patent for a nickel based catalyst is comparable to that set out in the comparative example of the present patent specification.

U.S. Pat. No. 3,673,281 discloses a process for the catalytic hydrogenation op polymers containing double bonds with a iron, cobalt or nickel based catalyst in the presence of an activator. Polymers containing a vinyl content of 10% were hydrogenated at 25° C. using a relatively low hydrogen pressure of 3.5 atmospheres. The patent shows that for this set of conditions vinyl bonds are preferentially hydrogenated by a cobalt based catalyst. Furthermore, the inventors observed that an iron based catalyst is generally less active when compared with a cobalt or nickel based catalyst. However, this reference does not give any indication or suggestion that an iron based catalyst would hydrogenate vinyl bonds more selectively and/or that desirable selective, partially hydrogenated elastomers could be made using an elastomer having a vinyl content of 20 to 65% before hydrogenation.

This problem of poor selectivity was addressed and solved in WO 02/34799, disclosing methods for partially and selectively hydrogenating block polymers with other catalysts. For instance, a process for preparing a partially hydrogenated butadiene polymer was described wherein a butadiene polymer comprising vinyl groups and 1,4-butadiene recurring units was hydrogenated in the presence of hydrogen, using instead of the nickel catalyst of U.S. Pat. No. 3,700,748, a titanium-, zirconium-, and/or hafnium-based metallocene compound as hydrogenation catalyst and an alkali metal hydride co-catalyst. According to this method the vinyl bonds were converted predominantly with hardly any conversion of the 1,4-double bonds. A drawback of this method, however, is the need of very expensive metallocene catalysts. Products made by this method are therefore inherently expensive.

It is therefore an object of the present invention to provide in a cheap catalyst that nevertheless gives excellent selectivity. Surprisingly, it was now found that despite the teaching of U.S. Pat. No. 3,700,748 iron-containing catalysts, at the right conditions, provide a much better selectivity than could be expected in view of the corresponding nickel catalysts.

SUMMARY OF THE INVENTION

To this end the invention pertains to a method for partially and selectively hydrogenating a polymer made of at least a conjugated diene monomer having a vinyl content of from 20 to 65%, comprising a hydrogenation step on a solution of the polymer, characterized in that the hydrogenation step is performed in the presence of an iron-containing catalyst whereby a hydrogenated polymer is obtained wherein the vinyl content is reduced to 5% or less, whereas the content of 1,4-double bonds is maintained at a level of at least 30%.

Products thus obtained can be used in many applications wherein the color of the product does not play a role. However, for some applications the use of the thus obtained products is seriously hampered by the occurrence of strong rust colored stain of the product. It is therefore another objective of the present invention to provide a cheap catalyst that has excellent selectivity properties on hydrogenating unsaturated block polymers with leaving as less as possible color thereon.

The invention therefore also pertains to methods that satisfy the above-mentioned objectives and that are moreover devoid of the disadvantages of the prior art methods, i.e. providing a cheap hydrogenation catalyst with excellent selectivity. To this end the invention further relates to a method for partially and selectively hydrogenating a polymer comprising a conjugated diene monomer wherein the hydrogenation step is performed by treating a solution of the polymer with an iron-containing catalyst and hydrogen to preferentially hydrogenate vinyl bonds over 1,4-double bonds, whereby the solution contains amounts of lithium alkoxide and iron-containing catalyst of which the molar ratio [lithium alkoxide]/[iron-containing catalyst] is less than 20. The problem of rust color staining particularly occurs with low molecular weight polymers, for instance polymers having a molecular weight less than 20,000, making this method therefore particularly useful for such polymers.

Lithium alkoxide is commonly present in the reaction mixture as a result of the method for making polymers of conjugated dienes, which for instance comprises: a) anionically polymerizing conjugated diene monomers, optionally with other monomers, to produce polymers with living chain ends; b) terminating the living chain ends with an alcohol, to produce a terminated block copolymer and to give a polymer, such as for instance an SBS polymer, and a lithium alkoxide. Another terminating agent is hydrogen. Exposure of hydrogen to the living polymer results in a terminated polymer and lithium hydride. Examples for the different termination methods are disclosed in WO 02/16449 A2. This patent application teaches that cobalt or nickel based catalysts show good hydrogenation activity in both methanol and hydrogen terminated polymer solutions without significant differences between termination with the one or the other. Molar ratio's of lithium alkoxide to hydrogenation catalyst of 9 up to more than 100 showed a good hydrogenation performance.

It was found that the method according to the invention leads to less colored or even uncolored products that are highly selectively hydrogenated. The term "highly selective" in this invention means selective hydrogenation of vinyl bonds over 1,4-double bonds whereby the ratio of the percentage of the conversion of the vinyl bonds versus the conversion of the 1,4-double bonds is at least 2 at a total conversion of vinyl and 1,4-double bonds of at least 40%. Preferably, this ratio is higher than 2.5.

It has been found important that the amount of lithium alkoxide in the polymer solution should be as low as possible, and preferably is not present at all. It was found that this aspect of the method is crucial for preventing the rust color stain of the end product. The amount of lithium alkoxide, such as lithium methoxide or the lithium salt of 2-ethyl-1-hexanol, is expressed by its ratio to iron-containing catalyst that is present in the system. The molar ratio [lithium alkoxide]/[iron-containing catalyst] should be less than 20, preferably less than 10, more preferably less than 5, and most preferably about 0. Such low ratios, most preferably 0 (i.e. no lithium alkoxide at all), can preferably be obtained by using a different method of terminating the polymerization process. Such method was found by terminating the polymerization process by hydrogen, which leads to lithium hydride rather than to lithium alkoxide. A combination of both termination methods (i.e. both alcohol and hydrogen termination) may also be used.

It was further found that the rust color stain problem could also be solved in another manner, that is to say by using a novel method of extracting the metal residue derived from the iron-containing catalyst (hereinafter referred to as hydrogenation catalyst residue) from the hydrogenated product. According to this aspect the invention comprises a method wherein the hydrogenation catalyst residue is extracted from the solution of hydrogenated polymer in the absence of an oxidation agent. Preferably, this extraction is performed in the absence of oxygen. A further improvement in preventing staining of the product is to extract it from the hydrogenating solution with a solution of an organic acid having 2 to 36 carbon atoms, and in the absence of the oxidation agent.

BRIEF DESCRIPTION OF THE FIGURE

The enclosed

DETAILED DESCRIPTION OF THE INVENTION

Figure 1:
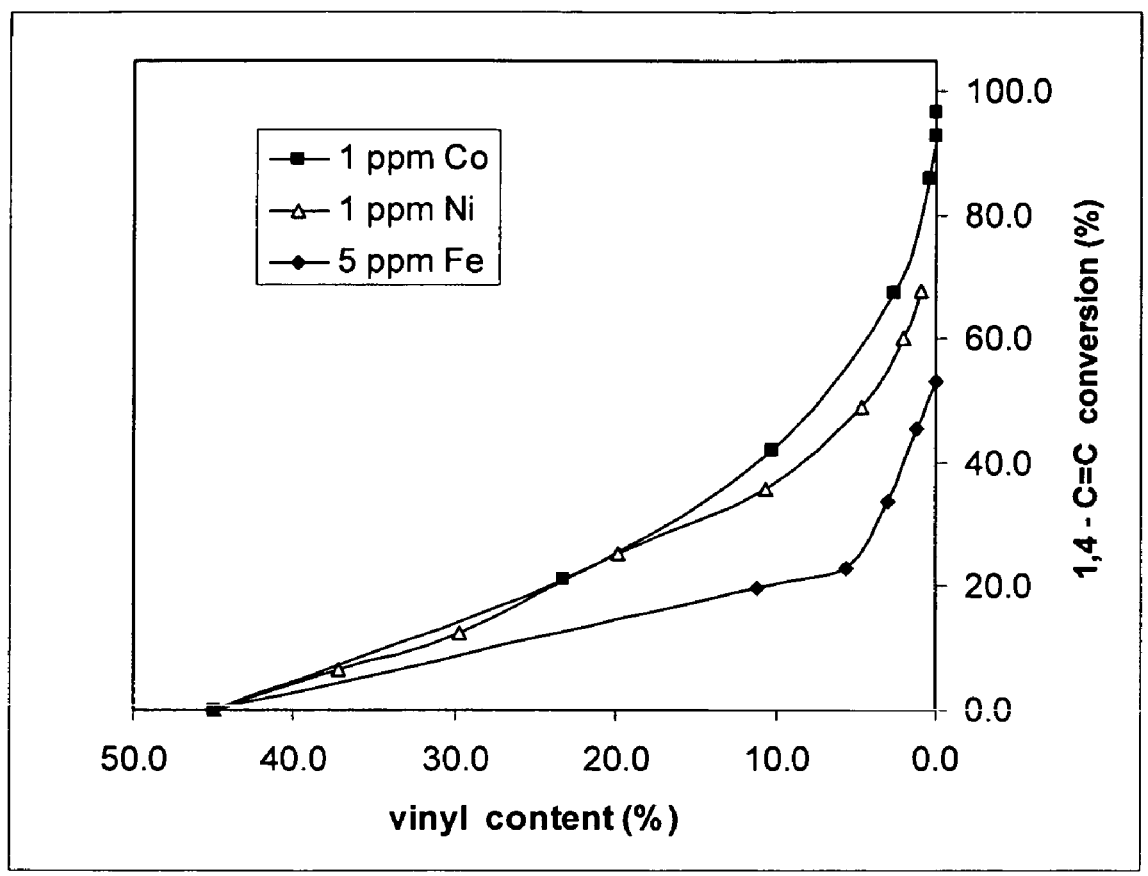
FIG. 1 illustrates the improved selectivity of iron-containing catalysts versus nickel- or cobalt-containing catalyst.

The iron-containing catalyst may be any iron-containing compound, such as a catalyst based on an iron salt including iron halide, iron carboxylate, iron acetyl acetonate, or iron alkoxide. A preferred catalyst is based on iron octanoate or iron 2-ethyl-1-hexanoate. The iron-containing catalyst for use in this invention can for instance be prepared by combining an iron carboxylate with a reducing agent, such as an alkyl aluminum, for instance in the manner as disclosed in U.S. Pat. No. 5,057,582.

The catalyst is used in amounts of from 0.001 to 1, typically from 0.005 to 0.5 mmole per 100 g of unsaturated compound, and preferably in amounts in the range of from 0.01 to 0.1 mmole/100 g. Larger quantities of catalyst may be used to speed up the hydrogenation process, although this may increase the color stain. If possible also less catalyst may be used, to reduce the staining, costs, and environmental impact of the catalyst system.

The present invention further provides the hydrogenation reaction as a relatively straightforward and uncomplicated reaction. For instance, in a preferred embodiment a polymer solution containing living polymer is terminated by adding hydrogen under vigorous stirring until the typical color of living polymer has disappeared.

The catalysts of this invention can be used to hydrogenate the double bonds of any polymer made of conjugated diene momomers, such as butadiene and/or isoprene polymers, copolymers, and block copolymers. In particular, they may be used for the selective hydrogenation of a block polymer comprising a polymer block of a vinyl aromatic monomer and a polymer block of a conjugated diene, such as butadiene and isoprene. The homopolymers, copolymers, and block copolymers are of medium molecular weight, i.e. having a weight average molecular weight in the range from 500 to 1,000,000. More preferably, the method is used for low molecular weight polymers having molecular weights below 20,000.

Homo- and copolymers of particular interest are homo- and copolymers of 1,3-butadiene or isoprene, and optionally another conjugated diene, and/or an aromatic vinyl compound such as styrene or alpha-methylstyrene and/or an acrylic compound, such as alkyl acrylate or alkyl methacrylate. Among these copolymers are included random copolymers in which the comonomers are randomly distributed along the polymer chain, cross-linked copolymers, and pure or gradual block copolymers.

The block copolymers are especially interesting since some of them are thermoplastic elastomers, which are useful from an industrial point of view. Such block copolymer comprise (a) at least one polymer block predominantly made of one or more aromatic vinyl compounds or predominantly made of one or more acrylic compounds, and (b) at least one polymer block predominantly made of a conjugated diene. The expression "predominantly" in this respect means for at least 80 mole %.

Other embodiments of block copolymers include linear, branched, radial, and star copolymers. Another group of interesting block copolymers includes polymers comprising at least one polymer block predominantly made of butadiene, and at least one polymer block predominantly made of one or more conjugated diene monomers other than butadiene. The block copolymers used preferably in this invention are the so-called styrenic block copolymers that contain between 10 to 90 wt. % of vinyl aromatic compounds. The preferred copolymers are those that have a vinyl content of approximately 20 to 65 wt. % in the polybutadiene block.

The block copolymers may also be functionalized. Derivatives may be obtained from block copolymers having at least one polymer block of an aromatic vinyl hydrocarbon and at least one polybutadiene block by hydrohalogenation, halogenation, carboxylation, epoxidation, hydroxylation, and chlorosulfonation. The polar derivatives so formed are useful for many commercial purposes.

The polymers made of conjugated diene monomers that can be hydrogenated according to this invention are usually obtained by a known anionic polymerization method. The anionic polymerization is especially interesting for producing polymers and copolymers that can be hydrogenated according to the invention. Among the initiators that can be used, the organo-lithium compounds are preferred, particularly butyl lithium compounds, such as n-butyl lithium and sec-butyl lithium.

Termination of the polymerization reaction is generally done by addition of a $C_1$-$C_{12}$ alcohol, such as a mono-alcohol or a polyol, an acid, including $C_1$-$C_{12}$ organic acids and mineral acids, a coupling agent such as an ester or silicon compound, water, or hydrogen, or by a combination of two or more of these methods. Examples of suitable alcohols are methanol and 2-ethyl-1-hexanol. It was found that addition of hydrogen rather than alcohol is strongly preferred because it leads to the formation of lithium hydride rather than to lithium alkoxide. It was found that the presence of a lithium alkoxide in a polymer solution has a strong negative impact on the stability of the iron-containing catalyst. In order to obtain the required vinyl bonds conversion levels, high amounts of iron-containing catalyst are necessary when substantial amounts of lithium alkoxide are present, and consequently the resulting polymers are strongly rust colored. The hydrogen termination method significantly adds to the success of the present method, particularly when low molecular weight polymers are made.

Hydrogenation is preferably carried out in solution of an inert hydrocarbon, which preferably is the same hydrocarbon solvent as employed during polymerization. The term "inert solvent" means an organic solvent that does not react with any of the reactants that participate in the reaction. Examples of these inert solvents that are recommended are aliphatic hydrocarbons and cycloaliphatic hydrocarbons, such as n-hexane, n-octane, iso-octane, cyclohexane, methylcyclopentane, cyclopentane, ethers such as tetrahydrofuran, aromatic hydrocarbons such as benzene, toluene, and xylene, which are not hydrogenated under the selected reaction conditions, and mixtures of these solvents.

Conventional hydrogenation conditions may be applied. For instance, suitable hydrogen pressures are between 1 and 70 kg/cm$^2$, preferably between 5 and 50 kg/cm$^2$.

Suitable reaction temperatures vary from 20 to 150° C., preferably between 50 and 120° C. Ideally, the conditions are selected such as to approach near full conversion of the vinyl bonds (i.e., less than 5% vinyl groups) with substantially less conversion of the 1,4-double bonds (i.e., maintaining a content of at least 30% of the 1,4-double bonds). In respect of the preferred embodiment, starting with a polymer having a vinyl content in the range of 30 to 60%, the condition are selected such as to hydrogenate the vinyl content to a degree of less than 3%, whilst maintaining a content of at least 30% of the 1,4-double bonds.

The extraction method preferably used in the present invention comprises a treatment with an aqueous mineral acid, optionally in combination with an organic acid, and preferably without an oxidation step preceding the extraction step. It should be noted that the extraction of nickel-containing catalysts with an organic acid is known from U.S. Pat. No. 2,893,982. As an improvement in respect of this technology, in a further U.S. Pat. No. 3,780,138 the combined use of an acid with an oxidation step has been propagated. Indeed, in more recent years use of dicarboxylic acids with (optionally for nickel) oxygen or a similar oxidant have been mentioned, e.g., in U.S. Pat. No. 4,595,749. Although, one of the claims of this patent suggest that an oxidation step is not needed for nickel extraction, no experimental details were specified. In U.S. Pat. No. 4,992,529 an extraction method is described wherein the solution of polymer with metals is contacted with an oxidizing agent followed by treatment with a combination of mineral acid and organic acid. In view of this clear trend towards combined use of an oxidation step and acid treatment, it was now surprisingly found that in case of iron-containing catalyst the oxidation step should actually be avoided.

It is therefore preferred that the hydrogenation catalyst residue is extracted from the solution of hydrogenated polymer in the absence of an oxidation agent, more specifically in the absence of oxygen. Extraction of the catalyst residue is preferably performed with a solution of an inorganic or organic acid, or a mixture thereof. Most preferably, the hydrogenation catalyst residue is extracted from the polymer solution with a mixture of an inorganic acid and an organic acid having 2 to 36 carbon atoms.

The product resulting from this selective hydrogenation can be analyzed by $^1$H-NMR spectroscopy to determine the presence or absence of vinyl groups. In the usual $^1$H-NMR analysis, any 1,4-double bond will show a chemical shift between 5.15 and 5.46 ppm. The vinyl bonds show two shifts, namely between 4.75 and 5.10 ppm and between 5.46 and 5.73 ppm.

The hydrogenation products may be easily isolated from the solvent through known processes such as distillation, precipitation, chromatography, and the like.

The invention is illustrated by means of the following non-limitative examples.

Preparation of SBS Block Copolymers

Polymer A

A 30 l batch of polystyrene-polybutadiene-polystyrene (SBS) block copolymer having a molecular weight of 258,000 was prepared in a stainless steel reactor by sequential anionic polymerization using sec-butyl lithium as the initiator. The polymerization was conducted in cyclohexane to which was added 150 ppm of diethoxypropane. At the end of the polymerization the living SBS-Li polymer was terminated with 1 equivalent of 2-ethyl-1-hexanol to produce a polymer solution comprising the polymer (SBS) and lithium 2-ethyl-1-hexanoxide. The polymer solution contained 10.4 wt. % of polymer. The styrene content of the SBS polymer is 30 wt. % and the vinyl content of the mid-block is 40 mol. %.

Polymer B

Using the process as for Polymer A, a polymer solution comprising a lower molecular weight Polymer B was made. The molecular weight was 110.000. The polymer solution contained 12.9 wt. % of Polymer B.

Polymer C

In a similar manner as for Polymer B, except using hydrogen instead of 2-ethyl-1-hexanol for terminating the polymerization, a hydrogen-terminated Polymer C was made.

At the end of the polymerization reaction the reactor was sparged with hydrogen to terminate the living SBS-Li polymer and to produce a polymer solution comprising Polymer C (SBS) and LiH.

Catalyst Preparation

Catalysts were prepared as solutions having a Ni, Co (comparison examples) or Fe concentration of 1000-1500 ppm (parts per million). The catalysts were prepared using nickel octanoate, cobalt neodecanoate or iron 2-ethyl-1-hexanoate by diluting the Ni, Co, or Fe carboxylates in cyclohexane and then slowly adding triethyl aluminum to obtain a 3.0/1 molar ratio of Al/M (wherein M=Ni, Co, or Fe).

Hydrogenation of SBS Block Copolymer

A stainless steel reactor was charged with 800 g of SBS polymer solution, prepared as described above. The temperature of the reactor was kept constant. A catalyst suspension of nickel-, cobalt-, or iron-containing catalyst was added to the reactor and the hydrogen pressure was raised to 40 bar. Immediately, an exothermic reaction started. The hydrogenation was allowed to run for several hours, during which period samples were drawn from the reactor and analyzed by $^1$H-NMR to determine the conversion of the olefinic double bonds.

EXAMPLES 1 AND 2 (COMPARISON)

An SBS polymer solution of Polymer A was hydrogenated using 1 ppm of Ni or Co catalyst in the polymer solution. The temperature of the reactor was kept constant at 40° C. The results are given in Table 1.

EXAMPLE 3

An SBS polymer solution of Polymer A was hydrogenated using 5 ppm of Fe catalyst in the polymer solution. The temperature of the reactor was kept constant at 70° C. The results are given in Table 1.

Comparison Example 1 and 2 shows that the method according to U.S. Pat. No. 3,700,748 did not give acceptable selectivity of reduction of vinyl bonds over 1,4-double bonds.

TABLE 1

Conversion data of hydrogenation experiments with Ni and Fe catalyst

| | Comparison Example 1 1 ppm Ni | | | | Comparison Example 2 1 ppm Co | | | | Example 3 5 ppm Fe | | |
|---|---|---|---|---|---|---|---|---|---|---|---|
| time (min) | vinyl content (%) | 1,4 C=C content (%) | 1,4 C=C conv. (%) | time (min) | vinyl content (%) | 1,4 C=C content (%) | 1,4 C=C conv (%) | time (min) | vinyl content (%) | 1,4 C=C content (%) | 1,4 C=C conv (%) |
| 0 | 45.0 | 53.4 | 0.0 | 0 | 45.0 | 53.4 | 0.0 | 0 | 45.0 | 53.4 | 0.0 |
| 5 | 37.2 | 49.8 | 6.6 | 10 | 23.3 | 42.1 | 21.1 | 5 | 11.2 | 42.8 | 19.9 |
| 10 | 29.6 | 46.7 | 12.6 | 20 | 10.2 | 30.9 | 42.1 | 10 | 5.6 | 41.2 | 22.8 |
| 20 | 19.9 | 39.8 | 25.4 | 35 | 2.6 | 17.3 | 67.5 | 25 | 2.9 | 35.3 | 33.9 |
| 35 | 10.6 | 34.2 | 35.9 | 60 | 0.4 | 7.5 | 85.9 | 50 | 1.2 | 29.0 | 45.7 |
| 60 | 4.6 | 27.3 | 48.9 | | | | | 90 | 0.0 | 24.9 | 53.3 |
| 100 | 2.1 | 21.3 | 60.1 | | | | | | | | |
| 160 | 1.0 | 17.2 | 67.8 | | | | | | | | |

EXAMPLE 4

An SBS polymer solution of Polymer B was hydrogenated using 5 ppm of Fe catalyst in the polymer solution. The temperature of the reactor was kept constant at 60° C. The results are given in Table 2.

EXAMPLE 5

The reactor was charged with Polymer C. 2-ethyl-1-hexanol was added to convert 66% of the LiH to the lithium alkoxide. The hydrogenation was carried out as in Example 4. The results are given in Table 2.

EXAMPLE 6

The reactor was charged with Polymer C. 2-ethyl-1-hexanol was added to convert 45% of the LiH to the lithium alkoxide. The hydrogenation was carried out as in Example 4. The results are given in Table 2.

EXAMPLE 7

The reactor was charged with Polymer C. The hydrogenation was carried out as in Example 4. The results are given in Table 2.

EXAMPLE 8

The reactor was charged with Polymer C. The SBS polymer solution was hydrogenated using 1 ppm of Fe catalyst in the polymer solution. The temperature of the reactor was kept constant at 60° C. The results are given in Table 2.

TABLE 3

Molar ratio of lithium alkoxide and iron and catalyst stability

| Example | [Li alkoxide]/[Fe catalyst] (mole/mole) | Catalyst activity* |
|---|---|---|
| 4 | 21.4 | Poor |
| 5 | 14 | Acceptable |
| 6 | 9.6 | Good |
| 7 | 0 | Very good |

*>90% conversion of vinyl groups for 5 ppm of catalyst at 60° C. within: 30 min (very good); 1 h (good); 4 h (acceptable); more than 4 h (poor).

Metal Extraction

Polymer D

Polymer D is a branched SBS type polymer having a styrene content of about 25% wt, a mole weight of 315,000, a vinyl content of about 60%, a couplings efficiency of about 67% (using diethyl adipate as a couplings agent). The polymer solution contained about 9 wt. % of polymer in cyclohexane. The polymer was partially selectively hydrogenated using 20 ppm of Fe catalyst in the polymer solution. After hydrogenation the vinyl content of the polymer is about 5% and the 1,4-double bonds content about 30%. The polymer solution was maintained under a nitrogen blanket after hydrogenation.

EXAMPLE 9

The extractions were performed in a 3 liter glass vessel at 75° C., which was thoroughly purged with nitrogen. To the vessel was added 0.8 liter of acid (0.5 wt. % $H_2SO_4$ in water) Nitrogen was bubbled through the solution for 30 minutes to

TABLE 2

Conversion data for polymer solutions with various lithium alkoxide amounts

| Time (min) | Example 4 1 eq of 2-EH* | | Example 5 0.66 eq of 2-EH | | Example 6 0.45 eq of 2-EH | | Example 7 no 2-EH | | Example 8 no 2-EH 1 ppm Fe | |
|---|---|---|---|---|---|---|---|---|---|---|
| | v.c.' (%) | 1,4 C=C (%) | v.c. (%) | 1,4 C=C (%) | v.c. (%) | 1,4 C=C (%) | v.c. (%) | 1,4 C=C (%) | v.c. (%) | 1,4 C=C (%) |
| 0 | 45.0 | 55.0 | 45.0 | 55.0 | 45.0 | 55.0 | 45.0 | 55.0 | 45.0 | 55.0 |
| 5 | | | | | | | 9.1 | 46.2 | | |
| 15 | | | | | | | 0 | 28 | | |
| 70 | | | 2.8 | 40.6 | 1.9 | 37.2 | | | | |
| 120 | | | 2 | 38.1 | 1 | 32.4 | | | 6.6 | 46.2 |
| 200 | 9.5 | 49.3 | 1.2 | 35.7 | 0.6 | 28.4 | | | 3.6 | 41.5 |

*2-EH stands for 2-ethyl-1-hexanol,
'v.c. stands for vinyl content

In Table 3 the molecular ratio of the lithium salt of 2-ethyl-1-hexanol and iron-containing catalyst for Examples 4 to 7 and the activity of the iron-containing catalyst in these polymer solutions are given. The amount of staining was determined indirectly by measuring the ratio at the same amount of staining. Higher ratio's mean that the hydrogenation conversion in insufficient or that the reaction does not come to an end.

suppress oxygen. 0.8 kg of the polymer solution D was added to the vessel under vigorous mixing (1200 rpm). Air was bubbled though the mixture for one minute. The pressure during extraction was maintained at less than 0.2 MPa. After 60 minutes the mixer was stopped and the contents were allowed to phase separate for 20 minutes. The aqueous phase was fully drained from the extraction vessel. A polymer solution sample was then taken. The sample was centrifuged in order to remove water. The amount of iron in the polymer was determined by inductively coupled plasma/mass spectroscopy (ICP/MS). The results are given in Table 4.

EXAMPLE 10

Example 9 was repeated. However, in this experiment no air was bubbled through the mixture of dilute acid and polymer solution. Again, the results are given in Table 4.

EXAMPLE 11

To the polymer solution of Example 9 was added 400 ppm of neodecanoic acid. Metals were removed according to the process as described above. The results are given in Table 4.

EXAMPLE 12

Similar to Example 10, to the polymer solution was added 400 ppm of neodecanoic acid. In this experiment no air was bubbled through the mixture of dilute acid and polymer solution. The results are given in Table 4.

TABLE 4

Iron content of polymers after metal extraction under various conditions

| Example | $O_2$ purge | Inorganic acid | Organic acid | Fe prior to wash (ppm) | Fe after wash (ppm) |
|---|---|---|---|---|---|
| 9 | yes | yes | — | 219 | 121 |
| 10 | no | yes | — | 219 | 41 |
| 11 | yes | yes | 400 ppm NDA* | 219 | 6 |
| 12 | no | yes | 400 ppm NDA | 219 | <5** |

*NDA is neodecanoic acid
**Detection limit is 5 ppm of metal on polymer

The invention claimed is:

1. A method for partially and selectively hydrogenating a polymer made of at least a conjugated diene monomer having a vinyl content, based on the content of polymerized conjugated diene, of from 20 to 65%, wherein the content of 1,4 double bonds is from 35 to 80% (together being 100%), comprising a hydrogenation step on a solution of the polymer, characterized in that the hydrogenation step is performed in the presence of an iron-containing catalyst whereby a hydrogenated polymer is obtained wherein the vinyl content is reduced to 5% or less, whereas the content of 1,4-double bonds is maintained at a level of at least 30%, and wherein the solution that is subjected to the hydrogenation step contains amounts of lithium alkoxide and iron-containing catalyst of which the molar ratio [lithium alkoxide]/[iron-containing catalyst] is less than 20.

2. The method of claim 1 for partially and selectively hydrogenating a polymer made of at least a conjugated diene monomer having a vinyl content of from 30 to 60%, wherein the hydrogenated polymer is obtained wherein the vinyl content is reduced to 3% or less, whereas the content of 1,4-double bonds is maintained at a level of at least 30%.

3. The method of claim 1 wherein the polymer is a block polymer comprising at least a polymer block of a vinyl aromatic monomer and a polymer block of a conjugated diene monomer.

4. The method of claim 1 wherein the polymer is a substantially completely hydrogen terminated polymer.

5. The method of claim 1 wherein the solution is substantially free from lithium alkoxide.

6. The method of claim 1 wherein the hydrogenation catalyst residue derived from the iron containing catalyst is extracted from the solution of hydrogenated polymer in the absence of an oxidation agent.

7. The method of claim 6 wherein the hydrogenation catalyst residue is extracted in the absence of oxygen.

8. The method of claim 6 wherein the hydrogenation catalyst residue is extracted from the solution of hydrogenated polymer with a solution of an inorganic or organic acid, or a mixture thereof.

9. The method of claim 7 wherein the hydrogenation catalyst residue is extracted from the solution of hydrogenated polymer with a solution of an inorganic or organic acid, or a mixture thereof.

10. The method according to claim 8 wherein the hydrogenation catalyst residue is extracted from the solution of hydrogenated polymer with a solution of an organic acid having 2 to 36 carbon atoms.

11. The method according to claim 9 wherein the hydrogenation catalyst residue is extracted from the solution of hydrogenated polymer with a solution of an organic acid having 2 to 36 carbon atoms.

12. The method of claim 2 wherein the polymer is a block polymer comprising at least a polymer block of a vinyl aromatic monomer and a polymer block of a conjugated diene monomer.

13. The method of claim 12 wherein the polymer is a substantially completely hydrogen terminated polymer.

14. The method of claim 13 wherein the solution is substantially free from lithium alkoxide.

15. The method of claim 14 wherein the hydrogenation catalyst residue derived from the iron containing catalyst is extracted from the solution of hydrogenated polymer in the absence of an oxidation agent.

16. The method of claim 15 wherein the hydrogenation catalyst residue is extracted in the absence of oxygen.

17. The method of claim 15 wherein the hydrogenation catalyst residue is extracted from the solution of hydrogenated polymer with a solution of an inorganic or organic acid, or a mixture thereof.

18. The method of claim 16 wherein the hydrogenation catalyst residue is extracted from the solution of hydrogenated polymer with a solution of an inorganic or organic acid, or a mixture thereof.

19. The method according to claim 17 wherein the hydrogenation catalyst residue is extracted from the solution of hydrogenated polymer with a solution of an organic acid having 2 to 36 carbon atoms.

20. The method according to claim 18 wherein the hydrogenation catalyst residue is extracted from the solution of hydrogenated polymer with a solution of an organic acid having 2 to 36 carbon atoms.

21. The method of claim 1 wherein the vinyl content is from 46 to 65%, and the content of 1,4-double bonds is from 35 to 54% (together being 100%).

* * * * *